Dec. 7, 1948.  J. L. WHITTAKER  2,455,456
THREE-DIMENSIONAL OSCILLOGRAPH SYSTEM
Filed Feb. 20, 1948
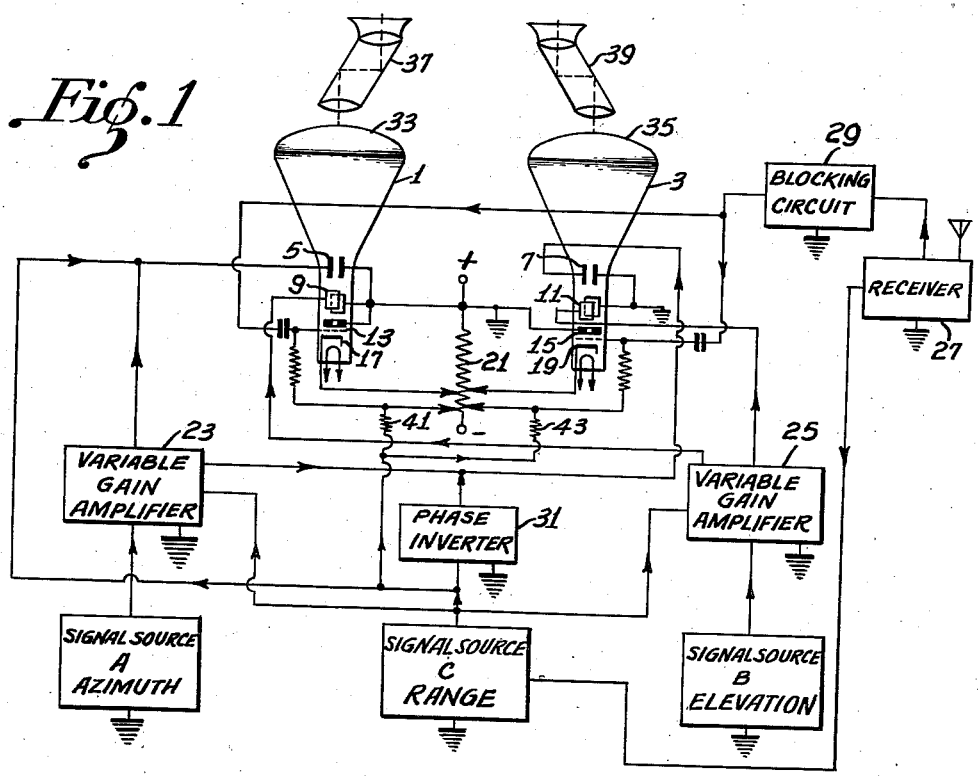
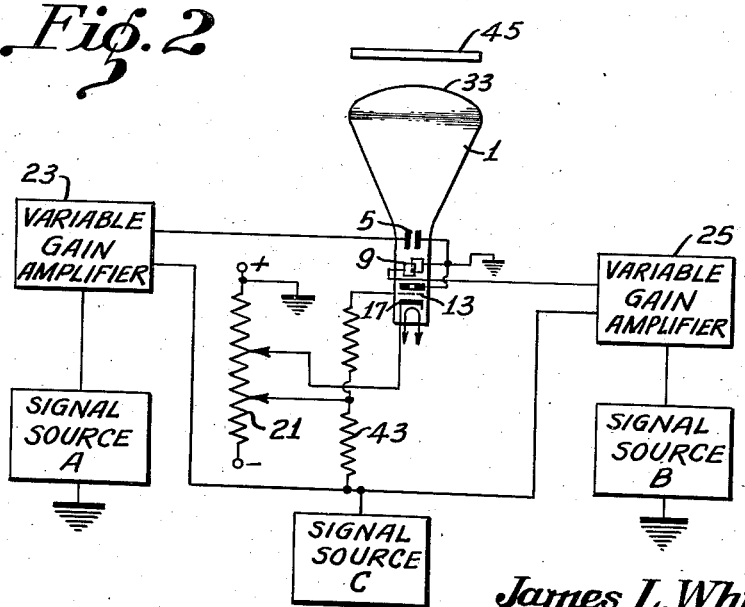
INVENTOR.
James L. Whittaker
BY
Conder C. Henry
ATTORNEY Patented Dec. 7, 1948

2,455,456

UNITED STATES PATENT OFFICE 2,455,456

THREE-DIMENSIONAL OSCILLOGRAPH SYSTEM

James L. Whittaker, Princeton, N. J., assignor to Radio Corporation of America, a corporation of Delaware Application February 20, 1948, Serial No. 9,783

10 Claims. (Cl. 315—9)

This invention relates to three-dimensional oscillograph systems and methods and more particularly to an oscillograph system and method wherein three variables may be indicated in true geometric relationship.

In studying many types of phenomena there often arise situations where the usual two-dimensional presentations of data are inadequate to show clearly the relationship between these variables. For example, there is the behaviour of non-linear electrical devices such as vacuum tubes; the interdependent relationship of temperature, pressure and volume; mathematical functions; and many others. An outstanding example is the location of an object in space by means of azimuth, range and elevation measurements in relation to an observer.

The ability of an observer to "see" an object as a three-dimensional one depends upon three basic factors: The geometrical shape, relative optical prominence, or perspective; the degree of binocular convergence required in looking at various parts of the object or stereoscopic effect; and the focus accommodation made by the eyes in viewing selected points on the figure. Attempts have been made to present each point in space expressed as a set of voltages and, by applying controlled combinations of such voltages to the deflecting circuits of a cathode ray oscilloscope, producing a pattern which is a projection, in effect collapsed into the face of the screen, of a three dimensional object. Then, by presenting the data as a stereoscopic pair providing an impression of depth.

Such systems have not been entirely satisfactory in that they have not taken into consideration the variation of apparent size with relation to range. Nor, have they taken into consideration the greater brightness required to delineate an object as its apparent size decreases relative to its distance from an observer. Thus, while an appearance in depth has been obtained, there has been no true geometric perspective of the object with relation to observer.

Accordingly, it is an object of my invention to provide methods and means for applying potentials to the control elements of a cathode ray oscillograph system in such a manner as to give an indication in true geometric perspective indicative of three variables.

It is a further object of my invention to provide oscillograph systems and methods in which the brightness of the image is related to its apparent distance from the observer.

Another object of my invention is to provide an oscillograph system in which the apparent size of an image will vary in inverse proportion to its apparent range from an observer.

Briefly, in accordance with the invention potentials indicative of two of three variables under consideration are applied to the deflecting elements of two cathode ray tubes. Both of these potentials are then varied in the same sense in inverse proportion to the third variable and corresponding ones of the two potentials are varied in the opposite sense in direct proportion to the third variable. The resultant images, viewed stereoptically give an apparent image in true geometric perspective.

The above and other objects and advantages of my invention will become apparent upon a consideration of the following detailed description taken in conjunction with the accompanying drawing, in which:

Fig. 1 represents diagrammatically an oscillograph system assembled in accordance with the invention; and Fig. 2 illustrates diagrammatically a system utilizing the invention in conjunction with a single cathode ray tube.

Referring to the drawing, it will be seen that there has been illustrated, as an example, an oscillograph system adapted to provide, in accordance with my invention, three dimensional indications of the three variables of azimuth, elevation and range. It will be understood that the principles of the invention are equally adaptable to any other set of variables. A pair of cathode ray tubes 1, 3, each provided with the usual horizontal deflecting elements, 5, 7; vertical deflecting elements 9, 11; grids or ray intensity control elements 13, 15; and electron emitting cathodes 17, 19. As is customary, one side of each of the vertical and horizontal deflecting elements of both tubes are grounded. A suitable source of operating potential (not shown) is connected across a voltage divider 21, which is provided with adjustable taps connecting the cathodes and grids at suitable points to establish them at the correct operating potential with reference to ground. Individual taps are provided for this purpose so that the tubes may be adjusted to operate in a substantially identical manner.

Potentials from signal source A, which vary as a function of the azimuth of the object under consideration are applied to the horizontal deflecting elements of both cathode ray tubes through a variable gain amplifier 23. Similarly, potentials from signal source B, which vary as a function of the elevation of the object under consideration are applied to the vertical deflection elements of both cathode ray tubes through a variable gain amplifier 25.

A receiver 27 operates to provide signal source C so that the potentials derived therefrom vary as a function of the range of the object under observation. This receiver is also utilized to control a suitable blocking circuit 29, the output of which is connected to the ray intensity control elements of both cathode ray tubes in such a manner as to prevent an indication being made on the luminescent screens of the cathode ray tubes except at such time as there are present signals pertinent to the object under consideration.

Potentials from signal source C are applied to the variable gain amplifiers 23, 25. These potentials also are applied directly to the horizontal deflection elements 5 of the cathode ray tube 1; and in opposite polarity or phase to the horizontal deflection elements 7 of the other cathode ray tube 3, through a phase inverter 31. Also these potentials are applied directly and cophasally to the grids of the cathode ray tubes through suitable resistors 41, 42.

In order to provide stereoscopic viewing of the images appearing on the screens 33, 35, any suitable optical arrangement such as the lens systems 37, 39 may be utilized.

In order to understand the operation of my invention the action of the circuit first will be explained in the absence of any potential derived from signal source C. The potentials derived from signal source A (azimuth) will be applied, through its associated variable gain amplifier, 23, to the horizontal deflecting elements 5, 7 of both cathode ray tubes. Simultaneously therewith, potentials from signal source B (elevation) are applied through its associated variable gain amplifier 25 to the vertical deflecting elements 9, 11 of both cathode ray tubes. The final result of these two sets of potentials is to cause to appear, on each screen 33, 35 of the cathode ray tubes, an image of the object under consideration. Both images will be equally displaced on corresponding coordinates of the two screens.

In order that these images may be viewed stereoscopically to give a three dimensional perspective, it is necessary first to displace one with respect to the other so that each eye will view the object from an apparently different aspect. To obtain a proper separation of the images to give a true geometric result it is necessary that their displacement be made directly proportional to the range of the object. That is, the greater displacement, the greater apparent distance. This is accomplished, in accordance with the invention by utilizing potentials from signal source C (range). These potentials are applied directly to the horizontal deflecting elements 5 of cathode ray tube 1, and in the opposite sense, by means of the phase inverter 31, to the horizontal deflecting elements 7 of the other cathode ray tube 3. The resultant effect of these additional potentials applied to the horizontal deflecting elements is to produce similar indications of the object under observation on each of the screens of the cathode ray tubes but displaced an amount which is proportional to the range of the object from the observer. These images, when viewed stereoscopically will give an appearance of depth.

However, as has been already pointed out, for the images to appear in true geometric perspective, it is necessary to take into consideration the apparent change in size of an object as its distance from the observer changes. Thus, the apparent size of an object varies inversely with the distance of the object from the observer. That is, the closer it is, the larger it appears. This is accomplished, in accordance with the invention, by utilizing the potentials from signal source C (range) to vary the gain of the amplifiers 23, 25 associated with signal sources A and B, in such a fashion as to cause their gain to be inversely proportional to the range of the object. The effect of this control of gain will be to decrease the horizontal and vertical potentials with increase in range and thus decrease the apparent size of the object. As the range decreases the reverse will be true and the object will apparently increase in size.

One further feature which must be considered in order to give an adequate picture of the object under observation is the need for a change in brightness as a function of range. That is, the further the object appears from the observer, the less bright it appears. Therefore, the intensity of the image is decreased as its size decreases and its apparent distance increases. This is accomplished, in accordance with the invention by applying the potentials from signal source C to the intensity control elements 13, 15 of the cathode ray tubes through suitable resistors 41, 43, in a manner to bias down the ray intensity as a function of the signal voltage C. Thus, the grid bias of the cathode ray tubes and accordingly the intensity of the image will be varied in proportion to the range of the object under consideration.

It will thus be seen that the resultant combinations of the aforementioned potentials will give two images the relative displacement, size and intensity of which will vary in such proportions as to provide two images which, when viewed stereoptically, will give a three dimensional representation of an object in true geometric perspective.

In order to view these images stereoptically it is only necessary to provide an optical system such that each image will be observed by only one of the observer's eyes. Such a system is represented generally by the elements 37, 39. Any suitable system may be used. Devices of this sort are well known in the optical art and their operation is believed to be clear.

It will be understood that while the signal sources A, B and C have been shown as being representative of azimuth, elevation and range, respectively, that these variables may be interchanged so as to provide any desired stereoscopic indications. Furthermore, other variables, such as those mentioned above, may be utilized instead of those illustrated. It is also believed clear that the principles described herein may be applied to conventional cathode ray oscilloscopes to provide any desired indications of three variables. Thus, by energizing two control elements of a cathode ray tube so as to vary as functions of two of the variables under consideration and changing their size and intensity, or either of them, as a function of a third variable it will be possible to obtain an image the resultant position and outline of which will be dependent upon the relationship of the three variables.

Such a system is illustrated in Fig. 2 wherein like numerals apply to like parts. Referring to this figure, it will be seen that the circuit connections are identical with those of Fig. 1 with the exception that only one cathode ray tube is utilized. Accordingly, the operation of the tube will be similar and the image will appear on the screen 33 in such a fashion that its relative size, its displacement with respect to the axis of the tube and its intensity will vary in accordance with the potentials from signal source C in addition to the usual variations produced by potentials from the signal sources A and B.

By means of a suitably designed coordinate scale 45, which may be spaced from the cathode ray tube as shown, or may be in contact with the surface thereof, the true relationship of the three variables may easily be determined.

Having described my invention, I claim:

1. A method of utilizing a pair of oscilloscopes for providing stereoscopic indications of three variables comprising, establishing similar indications on corresponding coordinates of both of said oscilloscopes as functions of two of said variables, varying in opposite sense said indications on the same coordinate of both of said oscilloscopes as a function of the third of said variables, varying in the same sense said indications on the same coordinate of both of said oscilloscopes as a function of the third of said variables, varying in the same sense the intensity of said indications on both of said oscilloscopes, and providing observable indications having stereoscopic characteristics.

2. An oscillographic system for three variables including a cathode ray oscilloscope having cathode ray generator means, vertical and horizontal ray deflecting elements and a ray intensity control element, means including separate variable gain amplifiers responsive to two of said variables connected respectively to said deflecting elements for establishing indications on two coordinates of said oscilloscope as functions of two of said variables, and means including said ray intensity control element for varying the intensity of said indications as a function of a third of said variables.

3. An oscillographic system for three variables including a cathode ray oscilloscope having cathode ray generator means, vertical and horizontal ray deflecting elements and a ray intensity control element, means including separate variable gain amplifiers responsive to two of said variables connected respectively to said deflecting elements for establishing indications on two coordinates of said oscilloscope as functions of two of said variables, and means including said variable gain amplifiers for varying in the same sense said indications on both coordinates of said oscilloscope as a function of said third of said variables.

4. An oscillographic system for three variables including a cathode ray oscilloscope having cathode ray generator means, vertical and horizontal ray deflecting elements and a ray intensity control element, means including separate variable gain amplifiers responsive to two of said variables connected respectively to said deflecting elements for establishing indications on two coordinates of said oscilloscope as functions of two of said variables, means including said ray intensity control element for varying the intensity of said indications as a function of a third of said variables, and means including said variable gain amplifiers for varying in the same sense said indications on both coordinates of said oscilloscope as a function of said third of said variables.

5. The method of utilizing a pair of oscilloscopes for providing stereoscopic indications of the azimuth, elevation and range of a plurality of points comprising establishing similar azimuth and elevation indications on corresponding coordinates of both of said oscilloscopes as functions of the azimuth and elevational spatial coordinates of said points, varying simultaneously in opposite sense said azimuth indications on both of said oscilloscopes as a direct function of the said range spacial coordinates of said points, varying simultaneously in the same sense said azimuth and elevational indications on both of said oscilloscopes as an inverse function of said range spacial coordinates of said points, and providing observable indications of said points having stereoscopic characteristics.

6. A stereoscopic oscillographic system for three variables including a pair of cathode ray oscilloscopes having cathode ray generating means, vertical and horizontal ray deflecting elements and a ray intensity control element, means including separate variable gain amplifiers responsive to two of said variables connected respectively to said deflecting elements for establishing similar indications on corresponding coordinates of both of said oscilloscopes as functions of two of said variables, means for deriving oppositely phased signals in response to the third of said variables, means for applying said oppositely phased signals to corresponding ones of said deflecting elements on each of said oscilloscopes for varying simultaneously in opposite sense said indications on the same coordinate of both of said oscilloscopes as a function of the third of said variables, means including said variable gain amplifiers for varying in the same sense said indications on both coordinates of both of said oscilloscopes as an inverse function of said third of said variables, and means including said ray intensity control element for varying the intensity of said indications as an inverse function of said third of said variables to provide indications of said variables having stereoscopic characteristics.

7. A stereoscopic oscillographic system for indicating the azimuth, elevation and range of a plurality of points including a pair of cathode ray oscilloscopes having cathode ray generator means, vertical and horizontal ray deflecting elements and a ray intensity control element, means including separate variable gain amplifiers responsive to two of said variables connected respectively to said deflecting elements for establishing similar indications on corresponding coordinates of both of said oscilloscopes as functions of the azimuthal and elevational coordinates of said points, means for deriving oppositely phased signals in response to the third of said variables, means for applying said oppositely phased signals respectively to said horizontal deflecting elements on each of said oscilloscopes for varying simultaneously in opposite sense said azimuthal indications of both of said oscilloscopes as a function of the range of said points, means responsive to said third variable for controlling simultaneously the gain of said amplifiers for varying in the same sense said azimuthal and elevational indications on both of said oscilloscopes as inverse function of said range of said points, and means including said ray intensity control element for varying the intensity of said indications as an inverse function of said range of said points to provide indications of said variables having stereoscopic characteristics.

8. A stereoscopic oscillographic system for indicating the azimuth, elevation and range of a plurality of points including a pair of cathode ray oscilloscopes having cathode ray generator means, vertical and horizontal ray deflecting elements and a ray intensity control element, means including separate variable gain amplifiers responsive to two of said variables connected respectively to said deflecting elements for establishing similar indications on corresponding coordinates of both of said oscilloscopes as functions of the azimuthal and elevational coordinates of said points, means for deriving oppositely phased signals in response to the third of said variables, means for applying said oppositely phased signals respectively to said horizontal deflecting elements on each of said oscilloscopes for varying simultaneously in opposite sense said azimuthal indications of both of said oscilloscopes as a function of the range of said points, and means responsive to said third variable for controlling simultaneously the gain of said amplifiers for varying in the same sense said azimuthal and elevational indications on both of said oscilloscopes as an inverse function of said range of said points to provide indications of said variables having stereoscopic characteristics.

9. A stereoscopic oscillographic system for three variables including a pair of cathode ray oscilloscopes having cathode ray generator means, vertical and horizontal ray deflecting elements and a ray intensity control element, means including separate variable gain amplifiers responsive respectively to said first and second variables connected respectively to said deflecting elements for establishing similar indications on corresponding coordinates of both of said oscilloscopes as functions of two of said variables, means for deriving oppositely phased signals in response to the third of said variables, means for applying differently phased signals to one of said deflecting elements on each of said oscilloscopes for varying simultaneously in opposite sense said indications on the same coordinate of both of said oscilloscopes as a function of said third of said variables, and means responsive to said third variable for controlling simultaneously the gain of said amplifiers for varying in the same sense said indications on both coordinates of both of said oscilloscopes as an inverse function of said third of said variables to provide indications of said variables having stereoscopic characteristics.

10. A stereoscopic oscillographic system for three variables including a pair of cathode ray oscilloscopes having cathode ray generator means, vertical and horizontal ray deflecting elements and a ray intensity control element, means including separate variable gain amplifiers responsive respectively to said first and second variables connected respectively to said deflecting elements for establishing similar indications on corresponding coordinates of both of said oscilloscopes as functions of two of said variables, means for deriving oppositely phased signals in response to the third of said variables, means for applying differently phased signals to one of said deflecting elements on each of said oscilloscopes for varying simultaneously in opposite sense said indications on the same coordinate of both of said oscilloscopes as a function of said third of said variables, means responsive to said third variable for controlling simultaneously the gain of said amplifiers for varying in the same sense said indications on both coordinates of both of said oscilloscopes as an inverse function of said third of said variables, means for deriving second signals in response to said third variable and means for applying said second signals to said ray intensity control element for varying the intensity of said indications as an inverse function of said third of said variables to provide indications of said variables having stereoscopic characteristics.

JAMES L. WHITTAKER.

REFERENCES CITED

The following references are of record in the file of this patent:

UNITED STATES PATENTS

| Number | Name | Date |
| --- | --- | --- |
| 2,426,189 | Espenschied | Aug. 26, 1947 |
| 2,426,979 | Ayres | Sept. 9, 1947 |
| 2,432,330 | Norgaard | Dec. 9, 1947 |
| 2,434,897 | Ayres | Jan. 27, 1948 |